(12) United States Patent
Hanmer

(10) Patent No.: US 9,230,255 B1
(45) Date of Patent: Jan. 5, 2016

(54) PAYMENT CARD HAVING LIGHT-EMITTING DIODE INDICATORS COORDINATED WITH STORED PAYMENT APPLICATIONS

(71) Applicant: MasterCard International Incorporated, Purchase, NY (US)

(72) Inventor: Matthew Hanmer, Abington (GB)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 14/461,055

(22) Filed: Aug. 15, 2014

(51) Int. Cl.
*G06K 19/06* (2006.01)
*G06Q 20/34* (2012.01)
*G06K 19/07* (2006.01)

(52) U.S. Cl.
CPC ........ *G06Q 20/3572* (2013.01); *G06K 19/0716* (2013.01)

(58) Field of Classification Search
CPC ........... G06K 19/07749; G06K 19/077; G07F 7/1008; B42D 15/10; G06Q 20/341; G06Q 30/02
USPC .......................... 235/492, 488, 487, 380, 375
IPC .. G06K 19/07749,19/077; G07F 7/1008; B42D 15/10; G06Q 20/341, 30/02
See application file for complete search history.

(56) References Cited

U.S. PATENT DOCUMENTS

| | | | |
|---|---|---|---|
| 7,784,687 B2 | 8/2010 | Mullen et al. | |
| 8,011,577 B2 | 9/2011 | Mullen et al. | |
| 8,074,877 B2 | 12/2011 | Mullen et al. | |
| 8,413,892 B2 | 4/2013 | Mullen et al. | |
| 8,459,548 B2 | 6/2013 | Mullen et al. | |
| 8,485,437 B2 | 7/2013 | Mullen et al. | |
| 8,523,059 B1 | 9/2013 | Mullen et al. | |
| 8,628,017 B2 | 1/2014 | Bona et al. | |
| 2013/0320080 A1 | 12/2013 | Olson et al. | |
| 2014/0081785 A1 | 3/2014 | Valadas Preto | |

*Primary Examiner* — Karl D Frech
(74) *Attorney, Agent, or Firm* — Buckley, Maschoff & Talwalkar LLC

(57) ABSTRACT

In an IC (integrated circuit) card, a selection signal is received from a user-actuatable switch to select between two different payment card accounts, each represented by a respective account indicator number stored in the IC component of the card. In response to the selection signal, a light-emitting diode indicator on the IC card is illuminated to indicate selection of a corresponding one of the payment card accounts.

19 Claims, 7 Drawing Sheets

PAYMENT CARD HAVING LIGHT-EMITTING DIODE INDICATORS COORDINATED WITH STORED PAYMENT APPLICATIONS

BACKGROUND

Traditionally, payment cards (such as credit or debit cards) provide a single function—access to a payment account associated with the payment card. More recently, integrated circuit (IC) cards have been introduced which allow payment cards to be provided which have microprocessors and memories thereon, providing an ability to store information about multiple payment accounts on the payment card (which may include an "EMV" chip to store the account information; as is well known, EMV is a widely used standard for payment card account transactions). It would be desirable to provide an improved and cost-effective user interface to facilitate using a single payment card to selectively access more than one account.

DETAILED DESCRIPTION

In general, and for the purpose of introducing concepts of embodiments of the present invention, light-emitting diode (LED) indicators are provided on a payment-enabled IC card as part of the user interface on the card. The user-interface may also include a user-actuatable switch that allows the user to select among (e.g., to toggle between) two or more payment applications stored on the EMV chip (assuming the card is adapted to operate in accordance with the EMV standard). With this switch, the user may effectively select a particular payment card account to be used for the next transaction or series of transactions in which the card is to be used. Each of the LED indicators may be pre-arranged to correspond to a respective one of the accounts available for access with the card, and may be selectively illuminated to indicate to the user which account he/she has currently selected.

As used herein, the IC card will be described for use in conjunction with one or more payment or financial applications, however, those skilled in the art will appreciate that embodiments may be used in conjunction with other applications as well, such as, for example, customer loyalty applications, identification applications or the like.

Figure 1:
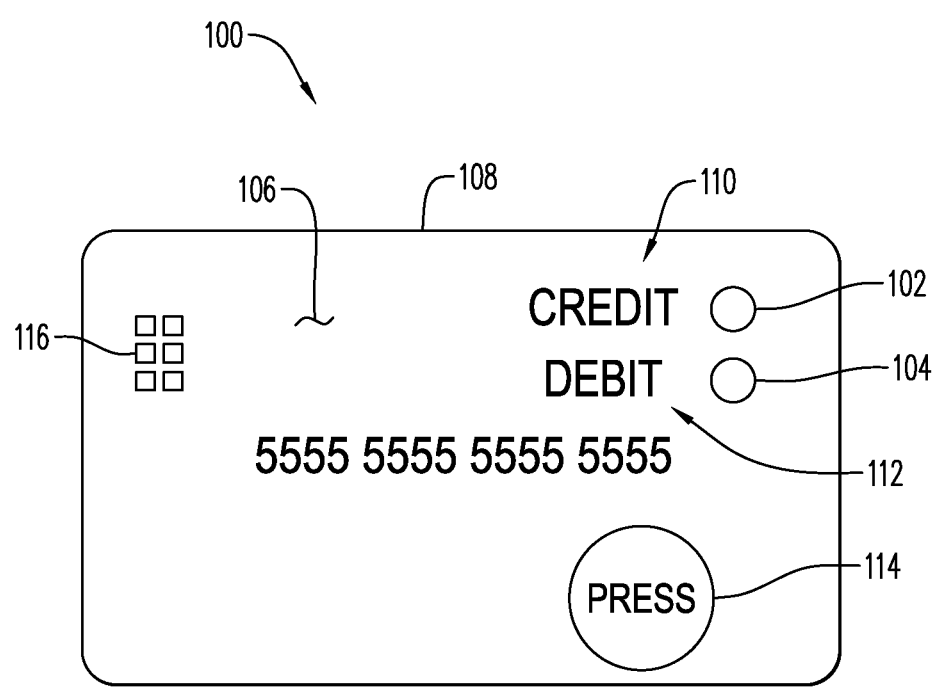
FIG. 1 is a plan view of a payment-enabled IC card according to some embodiments of the present invention.

FIG. 1 is a plan view of a payment-enabled IC card 100 (also referred to hereinafter as a "payment card") having LED indicators 102 and 104 mounted on the front surface 106 of a card-shaped body 108 according to some embodiments of the present invention. In particular, illustrated is a substantially card-shaped body 108 that might comprise an International Standards Organization/International Electrotechnical Commission ("ISO/IEC") 7810 ID-1 sized card having a thickness of 0.76 mm (0.030 in) and a top area of 85.60×53.98 mm (3.370×2.125 in) with rounded corners having a radius of 2.88-3.48 mm. However, this size and shape are provided for illustrative purposes only—those skilled in the art, upon reading the present disclosure, will appreciate that other shapes, form factors, sizes, and configurations of card-shaped bodies may be used in conjunction with embodiments of the present invention.

The card body 108 may be formed of one or more sheets of plastic or other materials. Note that any of the embodiments described herein might be formed of other materials having appropriate properties, such as strength, luminosity, and/or flexibility.

Also visible on the front surface 106 of the card body 108 are indicia 110 and 112. Each of the indicia may have the function of representing a respective payment card account that is to be accessed via the payment card 100. For example, in the embodiment illustrated in FIG. 1, the indicia 110 may represent a credit card account that belongs to the holder (not shown) of the payment card 100, whereas the indicia 112 may represent a debit card account that belongs to the cardholder. Thus, in this embodiment, the payment card may be intended to function as a "Combo Card" that combines credit card and debit card functions in a single card.

It will be noted that the LED indicator 102 is in proximity to the indicia 110 and the LED indicator 104 is in proximity to the indicia 112. Thus LED indicator 102 is intended, as part of the user interface for the payment card 100, to serve as a selectively illuminated element that indicates selection of the above-mentioned credit card function of the payment card 100. Similarly, LED indicator 104 may also be part of the user interface for the payment card 100, and may serve as a selectively illuminated element that indicates selection of the above-mentioned debit card function of the payment card 100. In some embodiments, one or the other of the LEDs 102, 104 is always illuminated (but never both), corresponding to an operating condition of the payment card 100 such that at any given time one and only one of the credit card and debit card functions is enabled. I.e., the payment card 100 may be programmed such that it is always operable as either a credit card or a debit card, but both the credit and debit card functions are never simultaneously operable.

Also seen on the front surface 106 is a user-actuatable switch or button 114 mounted on the card body 108. As will be discussed further below, the switch 114 may be operable to allow the user/cardholder to toggle between the credit and debit card functions of the payment card 100, and thus to select between the corresponding credit and debit card accounts represented by the payment card 100. When the credit card function is selected, LED 102 is always illuminated and when the debit card function is selected, LED 104 is always illuminated. Thus, the operation of the switch 114 effectively also toggles between lighting LED 102 and lighting LED 104, so that the LEDs provide an indication to the user as to which payment function is currently selected in the card 100.

In some embodiments, the payment card 100 may have multiple modes of communication. For example, a set of contacts 116 may be provided to allow contact communication with a terminal or other reader device. In some embodiments, the contacts 116 may enable communication with a POS terminal from an EMV chip (discussed below) included in the payment card 100 to effect choice of payment applications. In some embodiments, the payment card may have a magnetic stripe (not shown, may be on the back of the card) to allow mag stripe reading of account information from the payment card. In some embodiments, the mag stripe may not be rewriteable and so may only allow for a single static account to be accessible by mag stripe reading.

In some embodiments, the payment card 100 may have a wireless or contactless communication interface, allowing remote or contactless communication between the payment card 100 and a terminal or other reader device. Payment cards 100 having an ability to perform such contactless communication are provided with an antenna (not shown in FIG. 1, but discussed further below) for conducting contactless communication using, for example, radio frequency ("RF") electromagnetic waves. An oscillator (or oscillators) and additional circuitry for one or more of modulation, demodulation, downconversion and the like may further be provided. Pursuant to some embodiments, the payment card 100 has both contact and contactless modes of operation as will be described further herein.

In some embodiments, the payment card 100 is configured as a dual-interface device having both contact and contactless modes of operation as will be described further herein. Pursuant to some embodiments, the contact and contactless modes of operation may be performed in accordance with one or more standards, such as those set forth in ISO/IEC 7816 and ISO/IEC 14443 or the like. Further, the payment card 100 may be configured to operate in accordance with one or more payment application standards such as the EMV standards promulgated by EMVCo, LLC. However, those skilled in the art, upon reading the present disclosure, will appreciate that other payment and transaction standards may be used in conjunction with features of the present invention. For the purposes of describing and illustrating features of some embodiments, the payment card 100 will be described herein as being compliant with the EMV standards. The EMV standards define the interaction at the physical, electrical, data and application levels between IC cards and IC card processing devices for financial transactions.

Referring again to FIG. 1, the front surface 106 of the payment card 100 may have a payment card number 118 displayed thereon. The payment card number 118 may be applied to the card body 108 by, e.g., printing and/or embossing and/or laser printing. In some embodiments, the payment card number 118 may be a primary account number (PAN) that corresponds to the credit card account that is represented by the indicia 110.

Figure 2:
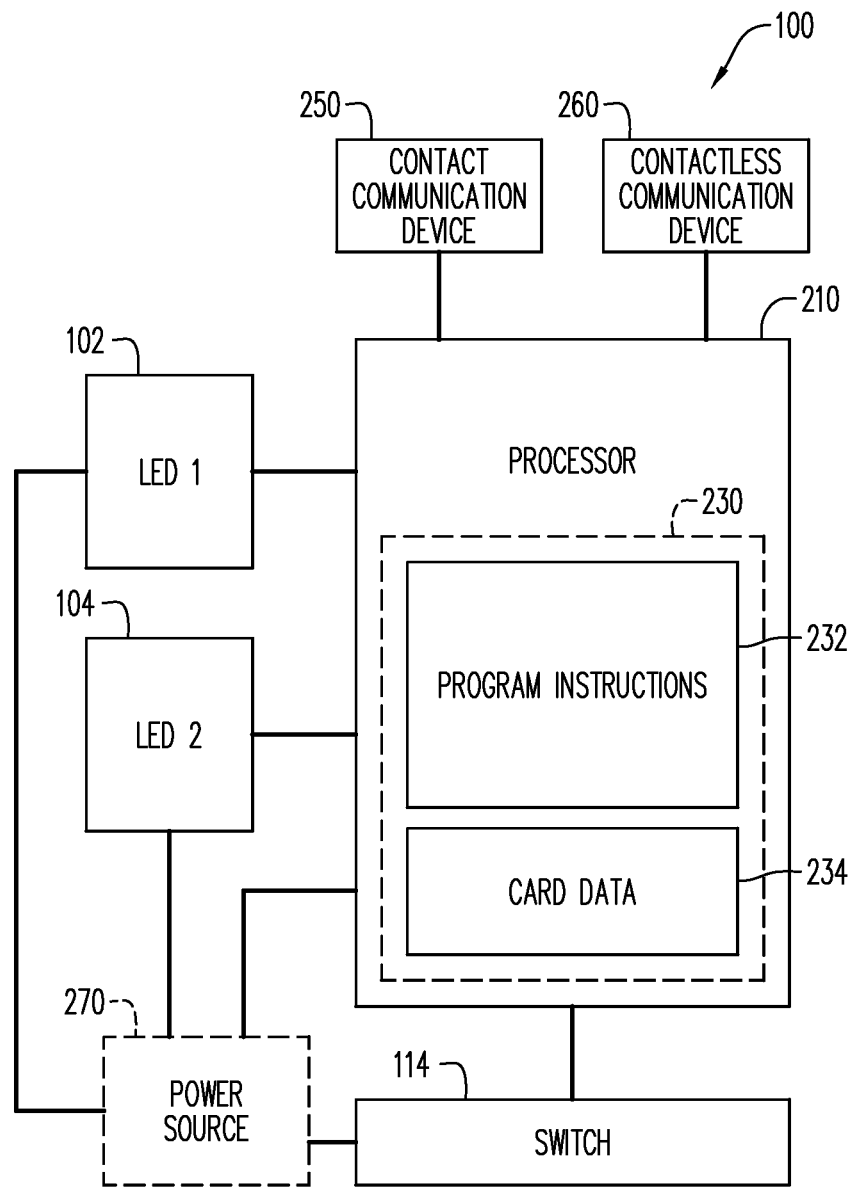
FIG. 2 is a block diagram view of components of a payment card such as the card of FIG. 1 pursuant to some embodiments.

The embodiments described herein may be implemented using any number of different hardware configurations. For example, FIG. 2 illustrates an example electrical, electronic and/or data-enabled component configuration of the payment card 100 as illustrated in FIG. 1. The payment card 100 comprises a processor 210, such as one or more commercially available Central Processing Units (CPUs) in the form of one-chip microprocessors, coupled to a contact communication device 250 and/or a contactless communication device 260 allowing communication between the processor 210 and a contact or contactless reader or terminal (not shown in FIG. 2) which may further be in communication with a payment network (not shown in FIG. 2) to allow operation of a selected one of the payment card functions featured by the payment card 100. For example, contact communication device 250 may include circuitry and components allowing the payment card 100 to communicate with a terminal or reader device using contact communications technologies (e.g., pursuant to ISO/IEC 7816 or the like). Similarly, the contactless communication device 260 may include circuitry and components allowing the payment card 100 to communicate with a terminal or reader device using contactless communications technologies (e.g., pursuant to ISO/IEC 14443 or the like). The communication devices 250, 260 may be used to communicate, for example, with one or more remote devices (not shown in FIG. 2, but described in FIG. 6).

In some embodiments, most or all of the electronic components shown in FIG. 2 may be constituted as an EMV chip, which stores the payment applications in question.

Also indicated in FIG. 2, as being operatively coupled to the processor 210, is the above-mentioned user-actuatable switch 114. Still further, FIG. 2 also shows the LED indicators 102 and 104 as being operatively coupled to the processor 210.

The processor 210 also communicates with a storage unit 230. The storage unit 230 may comprise any appropriate information storage unit, including combinations of persistent or non-persistent storage units such as semiconductor memory devices. The storage unit 230 stores program instructions 232 of various kinds, as will be described in more detail below in connection with FIG. 4. Further the storage unit 230 (e.g., as constituted by an EMV chip) also may store payment card account data, as represented by block 234 in FIG. 2. The payment card account data 234 may include, for example, one or more PANS and/or payment tokens that identify or point to the payment card accounts to be accessed using the payment card 100. The PANs and/or tokens may collectively be referred to as account indicator numbers. Other data, such as cardholder name, expiration date, encryption keys, etc. customarily stored in connection with a payment function on a payment card may also be included in the payment card account data represented at 234.

The processor 210 and storage device 230 may, in some embodiments, be constituted by an IC or "chip", which is not shown in FIG. 2 apart from the elements 210 and 230 depicted in the drawing. In terms of most or all of its hardware elements, the IC may be conventional. The storage device 230 may alternatively be referred to as a memory or (non-transitory) storage medium.

Pursuant to some embodiments, the payment card 100 also may include a battery or other power source 270 allowing the LEDs 102 and 104 and other elements to be operable even when the payment card 100 is not connected to a terminal or reader device.

While a single processor 210 is shown in FIG. 2, in some embodiments, two or more processors may be provided on the payment card 100. For example, one processor may be provided to perform standard payment chip processing, while a second processor may be provided to control other operating features of the payment card 100. In such embodiments, the second processor interacts with the first processor using an interface or communications bus (not shown in FIG. 2). As used herein, the term "payment chip" may refer to the processor used to perform payment application processing (e.g., pursuant to the EMV standards).

Figure 3:
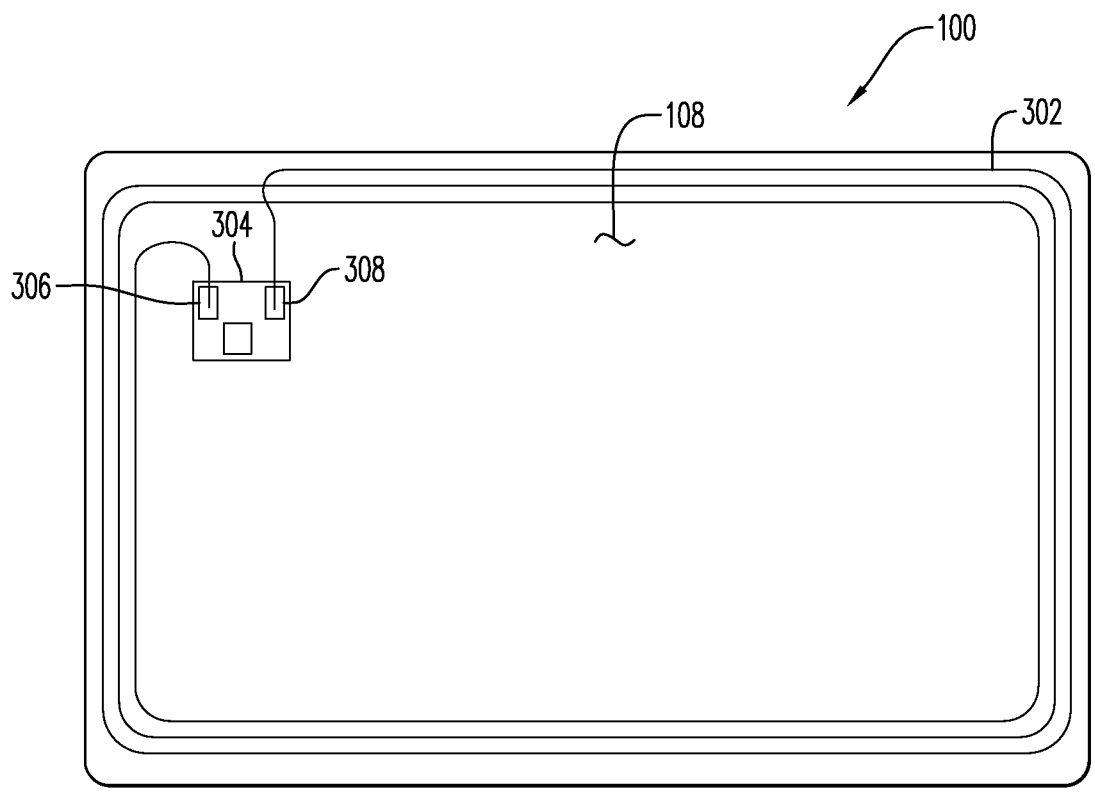
FIG. 3 is a schematic plan view schematically showing a physical arrangement of some components of the payment card of FIGS. 1 and 2.

FIG. 3 is a plan view schematically showing a physical arrangement of some components of the payment card 100. In particular, FIG. 3 again shows the card body 108, and also shows a loop antenna 302 partially or completely embedded in the card body 108. As will be appreciated by those who are skilled in the art, the antenna 302 may be utilized to receive and/or transmit data to/from the payment card 100 in conjunction with the contactless communication device 260 mentioned above in connection with FIG. 2.

FIG. 3 further shows the above-mentioned IC (indicated by reference numeral 304), which may encompass the processor 210 and storage unit 230 discussed above. The IC 304 may be operatively coupled to the loop antenna 302 via terminals 306 and 308.

Figure 4:
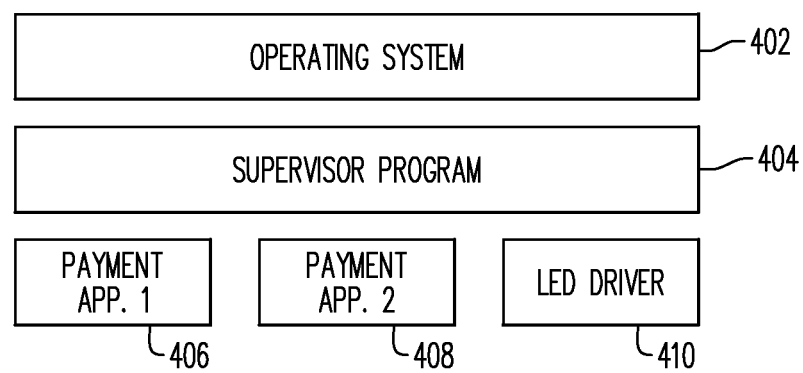
FIG. 4 is a diagram that illustrates some software aspects of the payment card of FIGS. 1-3.

FIG. 4 is a diagram that illustrates some software aspects of the payment card 100. The software described now in connection with FIG. 4 may correspond to at least a portion of the program instructions 232 referred to above in connection with FIG. 2.

Block 402 in FIG. 4 represents an operating system for controlling the processor 210. The operating system may load and execute applications and provide file management or other basic card services to the applications. In some embodiments, one or more applications may "sit" directly on hardware, that is, may be outside the domain of the operating system. One operating system that can be used to implement the invention is the MULTOS® operating system licensed by StepNexus Inc. Alternatively, JAVA CARD® based operating systems, based on JAVA CARD® technology, or proprietary operating systems available from a number of vendors, could be employed. Preferably, the operating system is stored in read-only memory ("ROM") within storage unit 230. In an alternate embodiment, flash memory or other non-volatile and/or volatile types of memory may also be used in the storage unit 230. In addition to the basic services provided by the operating system, the storage unit 230 may also include one or more applications as described herein. At present, one preferred standard to which such applications may conform is the EMV payment standard set forth by EMVCo, LLC.

Software stored in the storage unit 230 may also include a supervisor program 404. Aspects of the supervisor program 404 are described below. The functions handled by the supervisor program 404 may include coordinating selection and operation of payment applications 406 and 408 and an LED driver program 410.

In some embodiments, the processor 210 may perform program instructions 232, including but not limited to instructions included in the programs illustrated in FIG. 4, thereby allowing the payment card 100 to perform functions as described herein. In some embodiments, the processor 210 includes one or more secure elements that are personalized or configured to allow the processor 210 to function as a payment chip pursuant to a standard such as the EMV standard.

The programs described herein may be stored in a compressed, uncompiled and/or encrypted format. The programs may furthermore include other program elements, such as a database management system and/or device drivers used by the processor 210 to interface with peripheral devices. The storage unit 230 may include different types of memory, such as volatile and non-volatile memory and read-only and programmable memory. The storage unit 230 can store transaction card data such as, for example, a user's Primary Account Number ("PAN"). As used herein, information may be "received" by or "transmitted" to, for example: (i) the payment card 100 from another device; or (ii) a software application or module within the payment card 100 from another software application, module, or any other source (e.g., a transaction may involve data "received" by or "transmitted" or between a driver and a payment application).

Figure 5:
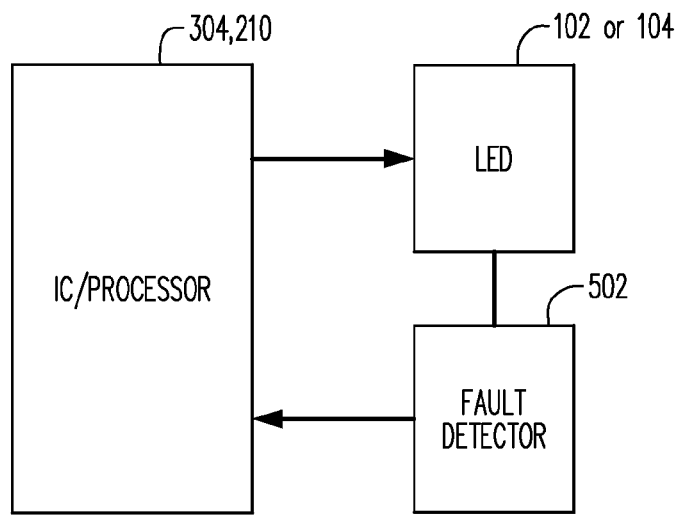
FIG. 5 is a block diagram that illustrates functionality that may be provided in some embodiments of the payment card of FIGS. 1-3.

FIG. 5 is a block diagram that illustrates functionality that may be provided in some embodiments of the payment card 100. FIG. 5 shows the IC 304/processor 210 coupled to the LED 102 or 104 to control the LED 102 or 104. A fault detector 502 is coupled to the LED 102 or 104 to detect malfunctioning of the LED 102 or 104 (i.e., to detect situations in which the LED is supposed to be illuminated but is not in fact illuminated). The fault detector 502 is coupled to the IC 304/processor 210 to report fault conditions of the LED to the IC/processor. The IC/processor may operate to inhibit/disable operation of a payment application associated with the LED in question at times when the LED in question exhibits a fault condition. Although only one fault detector 502 is shown, in practice, a respective fault detector may be provided for each of the LEDs 102, 104.

Figure 6:
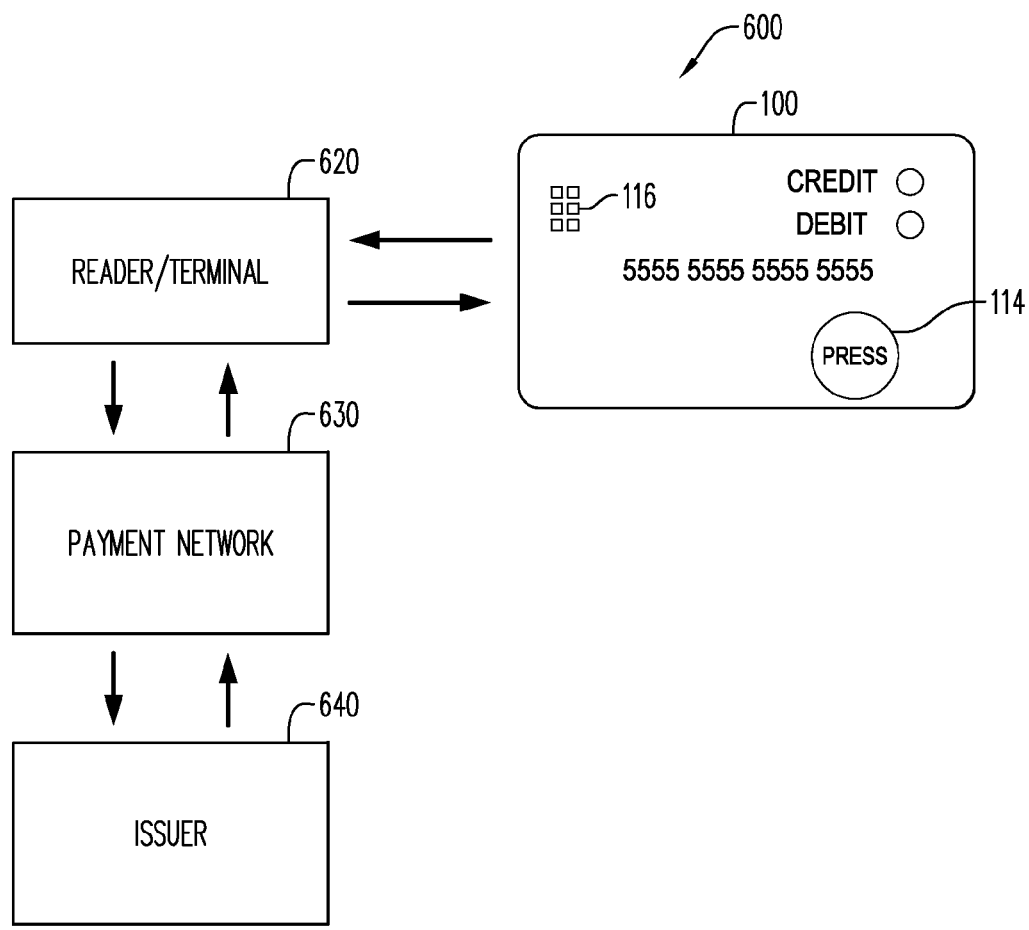
FIG. 6 is a block diagram view of system components involved in a payment card transaction pursuant to some embodiments.

Reference is now made to FIG. 6, where a transaction system 600 pursuant to some embodiments is shown. The transaction system 600 involves a number of components, including a payment card 100 (such as the payment card described above in conjunction with FIGS. 1-5) in communication with a reader/terminal device 620 (via contact and/or contactless communication). The reader/terminal device 620 is in communication with one or more payment networks 630 (such as, for example, the BANKNET system operated by MasterCard International Incorporated or the like) to transmit and receive information to and from one or more issuers 640.

A number of different types of readers/terminal devices 620 may be employed within system 600 pursuant to some embodiments. Such readers/terminal devices 620 can include contact readers configured to interact with a contact-type payment card 100, wireless or contactless readers configured to interact with a contactless-type payment card 100, and combined terminals. Such combined readers/terminal devices 620 are designed to interface with either (or both) contact and contactless-type payment cards 100. While not shown in FIG. 6, the reader/terminal devices 620 may include a memory and one or more processors. Pursuant to some embodiments, the devices 620 are configured to conform to the EMV standards, allowing the devices 620 to interact with payment cards 100 pursuant to those standards.

Functionality that may be provided by a payment card 100 (as shown in FIGS. 1-5) configured pursuant to the present invention will now be described by referring to a flow diagram presented at FIG. 7. In the flow described in FIG. 7, the payment card 100 may be configured to operate pursuant to the EMV standards—those skilled in the art will appreciate that in other embodiments the payment card 100 may be configured to perform in other environments to allow the payment card 100 to function pursuant to other payment or transaction standards.

Figure 7:
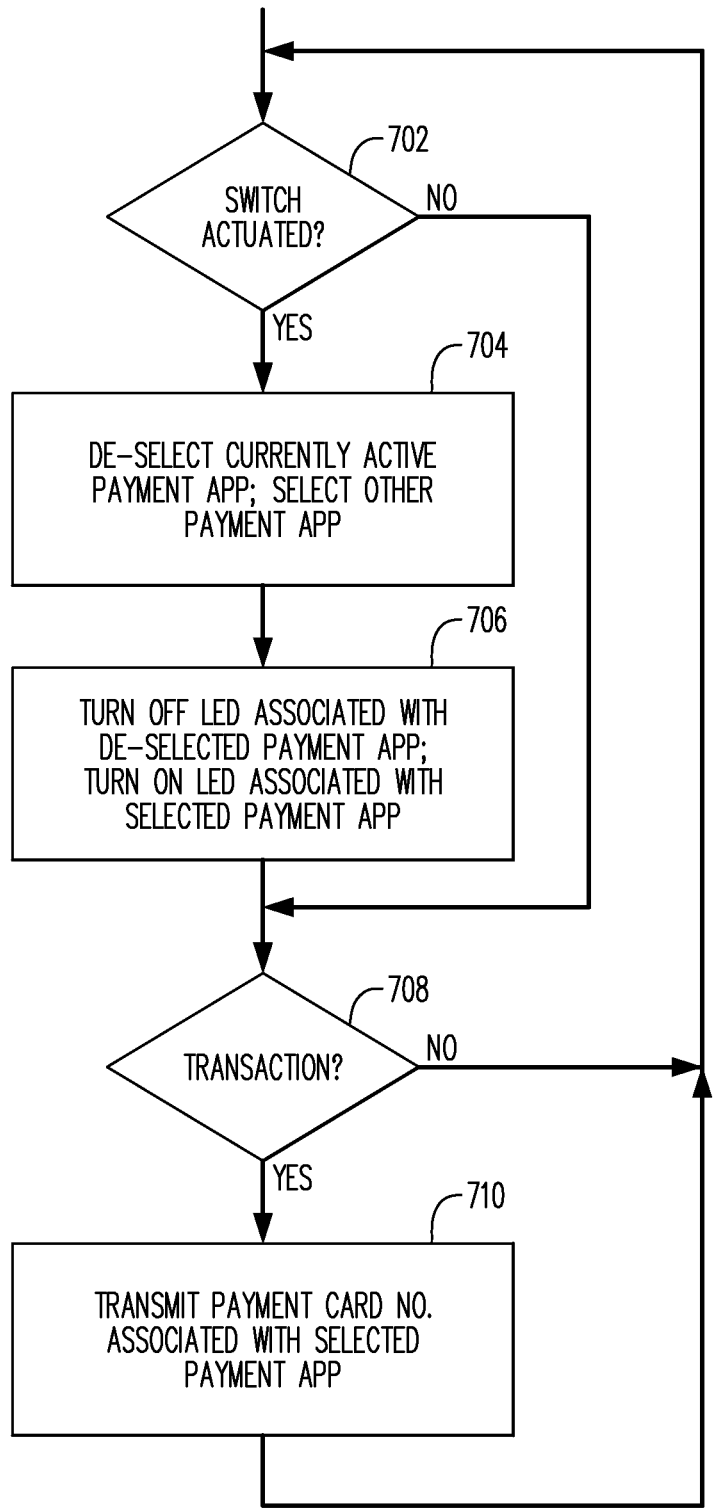
FIG. 7 is a flow diagram of a process conducted by the payment card of FIGS. 1-3 pursuant to some embodiments.

FIG. 7 is a flow diagram of a process conducted by the payment card 100 pursuant to some embodiments.

At a decision block 702 in FIG. 7, the processor 210 determines whether the switch 114 has been actuated. If so, then block 704 may follow decision block 702.

Noting again that the switch 114 may have the function of toggling between payment applications stored on the payment card 100, at block 704 in FIG. 7, the processor 210 may respond to actuation of the switch 114 by de-selecting the currently active one of the payment applications 406, 408, and selecting the other one of the payment applications. Thus, the processor 210 interprets the switch actuation as an account selection signal that is received by the processor 210.

Assuming, as has been suggested before, that a credit card account number (or token) has been stored in the storage unit 230 in association with one of the payment applications (say application 406) and a debit card account number (or token) has been stored in the storage unit 230 in association with the other one of the payment applications (say application 408), the toggling between payment applications has the effect of toggling between the credit card account and the debit card account respectively identified or pointed to by the stored card account numbers. Thus, if the credit card account had been selected prior to the switch actuation at 702, then block 704 results in selection of the debit card account in place of the credit card account. If the debit card account had been selected prior to the switch actuation at 702, then block 704 results in selection of the credit card account in place of the debit card account.

At block 706, and essentially simultaneously with block 704, the processor turns off the LED associated with the payment application de-selected at 702, and turns on the LED associated with the payment application selected at 704. Thus, if the debit card account/payment application was selected at 704, then the LED 102 (FIG. 1) is turned off and the LED 104 is turned on. If the credit card account/payment application was selected at 704, then the LED 104 is turned off and the LED 102 is turned on. Thus the changing state of illumination of the two LEDs reflects the toggling between payment applications/card accounts triggered by actuation of the switch 114, and provides feedback to the user (not shown) of the payment card 100 to reflect the account selection the user has made by actuating the switch 114. It will be noted that the indicia 110, 112 (FIG. 1) respectively associated with the LEDs 102, 104 play a role in providing the account selection feedback to the user.

In one path through the process of FIG. 7, decision block 708 follows blocks 704 and 706. Alternatively, if a negative determination was made at decision block 702 (i.e, switch actuation not detected), then decision block 708 directly follows decision block 702, and blocks 704 and 706 are bypassed. At decision block 708, the processor 210 determines whether the payment card 100 has been presented to a reader/terminal device 620 (FIG. 6) to perform a payment card account transaction. If such is not the case, then the process of FIG. 7 loops back from decision block 708 to decision block 702. It will be observed that during periods in which neither an actuation of switch 114 nor an attempted payment card account transaction occurs, the decision blocks 702 and 708, via their "no" branches, form an idle loop for the process of FIG. 7.

Considering again decision block 708, if a positive determination is made at that block (i.e., if the processor 210 determines that the user is presenting the payment card 100 to a reader/terminal device 620 for a payment card transaction), then block 710 follows decision block 708. It will be appreciated that one of the ways the payment card 100 may be presented to a reader/terminal device 620 may be by being interfaced to the reader/terminal device 620 via contacts 116 on the payment card 100. Alternatively, the payment card 100 may be presented to a reader/terminal device 620 by being brought into proximity to the reader/terminal device 620 for contactless communication via the antenna 302 of the payment card 100.

At block 710, the currently selected payment application causes the payment card 100 to transmit, to the reader/terminal device 620, the payment card account number associated with the currently selected payment application. Thus, if payment application 406 is currently selected at the time of the performance of block 710, then the payment card 100 transmits the corresponding credit card account number to the reader/terminal 620 to access the corresponding credit card account for the current transaction. If payment application 408 is currently selected at the time of the performance of block 710, then the payment card 100 transmits the corresponding debit card account number to the reader/terminal 620 to access the corresponding debit card account for the current transaction. It will be appreciated that the card account accessed at 710 corresponds to the indicia 110 or 112, as the case may be, that is currently indicated by the one of the LEDs 102, 104 that is currently illuminated (or that was briefly illuminated at the time of account selection). Thus the user knows from the indication provided by LED 102 or 104 which account the user is accessing for the current transaction.

In addition to transmission of the account number for the indicated payment card account, block 710 may include other conventional process steps associated with the applicable payment transaction protocol, including for example the customary process steps for an EMV transaction.

It will be noted that the process of FIG. 7 loops back from block 710 to decision block 702, and thus potentially to the idle loop made up of the "no" branches of decision blocks 702 and 708.

With a payment card as described above, and operation of the card as described in connection with FIG. 7, it is feasible to provide a dual function card inexpensively and with a user-friendly, intuitive user interface that facilitates easy selection by the user between two accounts and at times when the card is not interfaced to a terminal.

Although the example embodiment described above stores only two card account numbers, in other embodiments the payment card may be configured to support three or more different account numbers. In such cases, the card may include three or more LED indicators, each for indicating selection of a respective card account.

In the example embodiment described above, the two accounts available for selection are a credit card account and a debit card account. There are other possibilities, however, such as two different credit card accounts with different account features, two different debit card accounts, and/or any combination of two accounts including payment card accounts, loyalty or points accounts, benefits accounts, etc.

Figure 8:
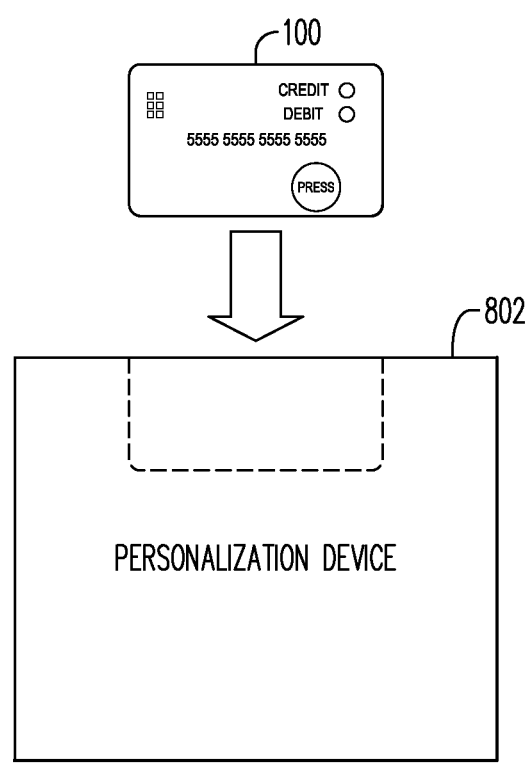
FIG. 8 schematically illustrates a card personalization process that may be performed in accordance with aspects of the present invention to provision the payment card of FIGS. 1-3.

FIG. 8 schematically illustrates a card personalization process that may be performed in accordance with aspects of the present invention to provision the payment card 100. In FIG. 8, a blank or partially blank version of the payment card 100 is shown being inserted into a personalization device 802 for processing by the personalization device. Personalization and/or pre-personalization steps may be performed by the personalization device 802. For example, the personalization device 802 may resemble commercially available smartcard personalization equipment marketed by Datacard Group, Minnetonka, Minn.

Figure 9:
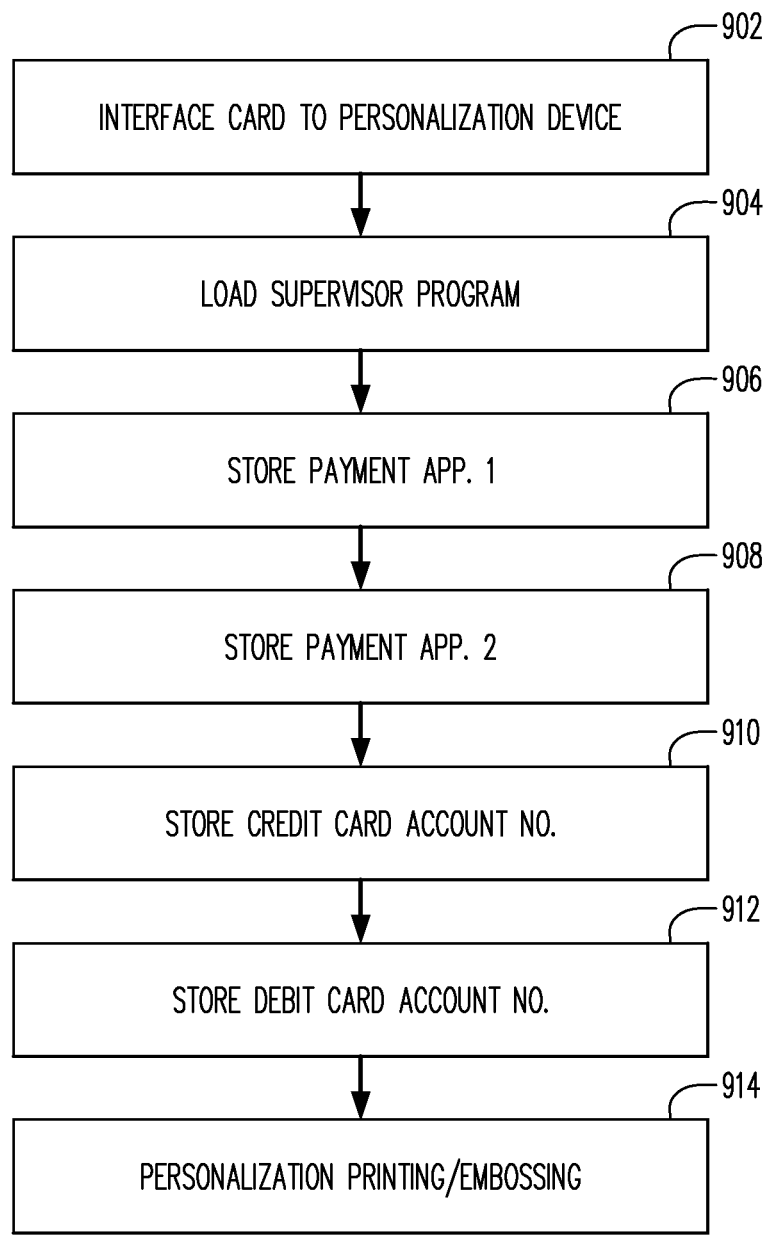
FIG. 9 is a flow diagram that illustrates aspects of the card personalization process in accordance with an embodiment of the present invention.

FIG. 9 is a flow diagram that illustrates aspects of the card personalization process in accordance with an embodiment of the present invention.

At 902 in FIG. 9, the payment card 100 is interfaced to the card personalization device 802.

It may be assumed that some degree of pre-personalization may already have occurred, including storing the operating system in the IC 304. If such is not the case, the storing of the operating system in the IC 304 may take place as part of the process of FIG. 9.

At 904, the supervisor program 404 may be stored/loaded into the IC 304. This may also include storing/loading of driver programs, including drivers for the LEDs.

At 906, the payment application 406 may be stored in the IC 304. The logic of the supervisor program 404 and/or the manner and/or location of storage of the payment application 406 may be such as to associate the payment application 406 with the LED 102.

At 908, the payment application 408 may be stored in the IC 304. The logic of the supervisor program 404 and/or the manner and/or location of storage of the payment application 408 may be such as to associate the payment application 408 with the LED 104.

At 910, the credit card account number (or token) that corresponds to the credit card account to be accessed by the payment card 100 is stored in the IC 304 by the card personalization device 802 in association with the payment application 406.

At 912, the debit card account number (or token) that corresponds to the debit card account to be accessed by the payment card 100 is stored in the IC 304 by the card personalization device 802 in association with the payment application 406.

Additional information typically stored in a payment IC card may also be stored in the IC 304 by the card personalization device 802.

At 914, the card personalization device 802 may print and/or emboss one or both of the credit card account number and the debit card account number on the payment card 100. In some embodiments, only the credit card account number is printed or embossed on the payment card 100. In some embodiments, the credit card account number is printed or embossed on the front of the payment card 100 and the debit card account number is printed on the back (not shown) of the payment card 100. In some embodiments, additional information may be printed or embossed on the payment card, including, for example, the cardholder's name and/or the card expiration date. In some embodiments, the indicia 110 and 112 (FIG. 1) may have been pre-printed on the card blank along with other printed matter such as, for example, issuer and payment network branding and/or logos and/or card brand name/logos, etc. In some embodiments, the card personalization device 802 may print the indicia 110, 112 on the payment card 100.

In some embodiments, the process illustrated in FIG. 9 may include conventional pre-personalization steps, and/or may be divided between two, three or more items of card personalization and/or pre-personalization equipment.

The programming of the IC 304, via the supervisor program 404 and/or otherwise, may be such that the LED 102 is illuminated at times when the payment application 406 (and hence the credit card account corresponding to the stored credit card account number) is selected via actuation of the switch 114. Also, via programming of the IC 304, the LED 104 is illuminated at times when the payment application 408 (and hence the debit card account corresponding to the stored debit card account number) is selected via actuation of the switch 114. Logic programmed into the IC 304—e.g., as part of the supervisor program 404—also may control the payment card 100 such that the two LEDs are never simultaneously illuminated. Still further, the IC 304 may be operable with the supervisor program 404 and/or other program instructions such that the payment card 100 transmits the credit card account number to the card reader if and only if the LED 102 is illuminated at that time, and transmits the debit card account number to the card reader if and only if the LED 104 is illuminated at that time. The hardware arrangement shown in FIG. 5, and supporting program instructions in the supervisor program 404 or elsewhere in the IC 304, may ensure that the payment card 100 does not transmit the corresponding payment card account number to a card reader at a time when the associated LED is malfunctioning such that it fails to be illuminated even though the corresponding payment application has been selected. In other embodiments, the payment card 100 may operate to signal that it is malfunctioning by simultaneously illuminating both LEDs.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling purchase transactions and related transactions. An example of such a system is the one operated by MasterCard International Incorporated, the assignee of the present disclosure. In some embodiments, the term "payment card system" or "payment system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. An apparatus comprising:
  a body;
  a first indicia printed on the body and representing a first payment card account;
  a first light-emitting diode (LED) mounted on the body in proximity to said first indicia;
  a second indicia printed on the body and representing a second payment card account different from the first payment card account;
  a second LED mounted on the body in proximity to said second indicia;
  a user-actuatable switch mounted on the body; and
  an integrated circuit (IC) supported by the body and operatively coupled to the first LED, the second LED and the user-actuatable switch;
  the IC storing a first account indicator number that corresponds to said first payment card account, and a second account indicator number that corresponds to said second payment card account;
  the IC programmed to allow a user to toggle between the first payment card account and the second payment card account by actuating the user-actuatable switch;

the IC programmed to cause the first LED to be illuminated in response to the user selecting the first payment card account; and the IC programmed to cause the second LED to be illuminated in response to the user selecting the second payment card account;

wherein no other user-actuatable switch is supported on said body apart from said switch for toggling between the first payment card account and the second payment card account.

2. The apparatus of claim 1, wherein:

the IC is programmed to transmit the first account indicator number to a card reader device at times when the first LED is illuminated; and the IC is programmed to transmit the second account indicator number to the card reader device at times when the second LED is illuminated.

3. The apparatus of claim 1, wherein:

the first indicia indicates that the first payment card account is a credit card account; and the second indicia indicates that the second payment card account is a debit card account.

4. The apparatus of claim 1, wherein:

the IC stores a first payment application program and a second payment application program, the first account indicator number associated with the first payment application program, the second account indicator number associated with the second payment indicator number.

5. The apparatus of claim 1, further comprising:

a plurality of electrically conductive contacts formed on the body, the contacts coupled to the IC, the contacts for interfacing the IC to a card reader device.

6. The apparatus of claim 1, further comprising:

a loop antenna at least partially embedded in the body, the antenna coupled to the IC, the antenna for transmitting and receiving wireless communication signals to and from a card reader device.

7. The apparatus of claim 1, wherein both of said first and second account indicator numbers are visible in human-readable form on said body.

8. The apparatus of claim 1, wherein the IC is operative to provide signaling that the apparatus is in a malfunctioning condition, said signaling comprising simultaneous illumination of both the first LED and the second LED.

9. A method comprising:

receiving a selection signal in an integrated circuit (IC) that is part of an IC card, the selection signal for selecting between at least two payment card accounts, each of said accounts represented by a respective account indicator number stored in the IC; and in response to the selection signal, illuminating one of a plurality of light-emitting diodes (LEDs) on said IC card, the illuminated LED corresponding to a one of said accounts, said one of said accounts selected by said received selection signal; and generating said selection signal by actuation of a user-actuatable switch on said IC card wherein:

a single actuation of said user-actuatable switch causes one of said plurality of LEDs to be turned off by the IC and causes another one of said plurality of LEDs to be turned on by the IC;

the IC card stores no more than two account indicator numbers; and actuation of said user-actuatable switch toggles between the two payment card accounts represented by said two stored account indicator numbers.

10. The method of claim 9, further comprising:

interfacing the IC card to a contact card reader device after actuating the user-actuatable switch to select said one of said payment card accounts.

11. The method of claim 9, further comprising:

bringing the IC card into proximity to a contactless card reader device after actuating the user-actuatable switch to select said one of said payment card accounts.

12. The method of claim 9, further comprising:

transmitting, from the IC to a card reader device, a one of said account indicator numbers, said transmitted one of said account indicator numbers representing said one of said accounts selected by said received selection signal.

13. A method comprising:

interfacing an integrated circuit (IC) card to a card personalization device; the IC card including an IC, a user-actuatable switch, a first light-emitting diode (LED), and a second LED; the first and second LEDs controllable by the IC;

storing a first payment application program in the IC;

storing a second payment application program in the IC;

programming the IC such that actuation of the user-actuatable switch toggles between the first payment application program and the second payment application program;

further programming the IC to associate the first payment application program with the first LED such that the IC causes the first LED to be illuminated at times when actuation of the user-actuatable switch results in selection of the first payment application program;

further programming the IC to associate the second payment application program with the second LED such that the IC causes the second LED to be illuminated at times when actuation of the user-actuatable switch results in selection of the first payment application program;

further programming the IC such that the IC does not cause both the first LED and the second LED to be simultaneously illuminated;

using the card personalization device to store a first payment card account number in the IC in association with the first payment application program;

using the card personalization device to store a second payment card account number in the IC in association with the second payment application program; and further programming the IC such that during a payment transaction the IC transmits the first payment card account number to a card reader device if and only if the first LED is illuminated and the IC transmits the second payment card account number to the card reader device if and only if the second LED is illuminated.

14. The method of claim 13, further comprising:

providing a first indicia on the IC card adjacent the first LED; and providing a second indicia on the IC card adjacent the second LED;

wherein the first indicia indicates a first payment card account represented by said first payment card account number, and the second indicia indicates a second payment card account represented by said second payment card account number.

15. The method of claim 13, further comprising:

printing at least one of said payment card account numbers on the IC card.

16. The method of claim 15, wherein both of said payment card account numbers are printed on the IC card.

17. The method of claim 13, further comprising:
embossing or laser printing one of the payment card account numbers on the IC card.

18. The method of claim 17, wherein only one payment card account number is embossed on the IC card.

19. The method of claim 13, further comprising:
further programming the IC such that the IC is disabled from utilizing the first payment card account number for a payment transaction at times when the first LED is malfunctioning.

* * * * *